United States Patent
Wight et al.

(10) Patent No.: US 11,361,282 B2
(45) Date of Patent: Jun. 14, 2022

(54) SCALABLE SYSTEM FOR DYNAMIC USER AUDIENCE DETERMINATION

(71) Applicant: Microsoft Technology Licensing, LLC, Redmond, WA (US)

(72) Inventors: Jeffrey L. Wight, Kirkland, WA (US); David M Cohen, Duvall, WA (US); Dmitriy Meyerzon, Bellevue, WA (US); Praveen Kumar Reddy Malireddy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 512 days.

(21) Appl. No.: 16/056,170

(22) Filed: Aug. 6, 2018

(65) Prior Publication Data
US 2020/0042944 A1    Feb. 6, 2020

(51) Int. Cl.
*G06F 16/00* (2019.01)
*G06Q 10/10* (2012.01)
*G06F 16/2455* (2019.01)
*G06F 16/2457* (2019.01)

(52) U.S. Cl.
CPC ....... *G06Q 10/101* (2013.01); *G06F 16/2457* (2019.01); *G06F 16/24552* (2019.01); *G06Q 10/103* (2013.01); *G06Q 10/1093* (2013.01)

(58) Field of Classification Search
CPC .............. G06Q 10/101; G06Q 10/103; G06Q 10/1093; G06F 16/24552; G06F 16/2457
See application file for complete search history.

(56) References Cited

U.S. PATENT DOCUMENTS

| | | | |
|---|---|---|---|
| 7,805,332 B2 | 9/2010 | Wilson | |
| 7,853,665 B1* | 12/2010 | Veeraraghavan | G06Q 30/02 709/217 |
| 8,850,473 B2 | 9/2014 | Sheehan et al. | |
| 2005/0166233 A1* | 7/2005 | Beyda | G06Q 30/08 725/46 |
| 2005/0246736 A1 | 11/2005 | Beyda et al. | |
| 2006/0224447 A1 | 10/2006 | Koningstein | |

(Continued)

FOREIGN PATENT DOCUMENTS

WO    2016049434 A1    3/2016

OTHER PUBLICATIONS

"International Search Report and Written Opinion Issued in US Patent Application No. PCT/US2019/038817", dated Oct. 1, 2019, 11 Pages.

(Continued)

*Primary Examiner* — Ashish Thomas
*Assistant Examiner* — Suman Rajaputra
(74) *Attorney, Agent, or Firm* — Schwegman Lundberg & Woessner, P.A.

(57) ABSTRACT

A system may include a processor; and a memory storing instructions that, when executed by the processor, configure the processor to: receive, from a computing device, a request for a set of content, the request associated with a user identifier; query a cached data store to determine that a set of audiences for the user identifier is stale; in response to the determination that the set of audiences is stale: access user properties for the user identifier; and generate the set of audiences for the user identifier based on the user properties; and serve the set of content according to the generated set of audiences.

20 Claims, 6 Drawing Sheets

(56) References Cited

U.S. PATENT DOCUMENTS

| | | |
|---|---|---|
| 2008/0228537 A1 | 9/2008 | Monfried et al. |
| 2013/0318191 A1* | 11/2013 | Yin ................... H04L 67/2852 709/213 |
| 2014/0164394 A1 | 6/2014 | Maru et al. |
| 2016/0012099 A1* | 1/2016 | Tuatini ............... G06Q 30/0271 707/689 |
| 2016/0071161 A1 | 3/2016 | Kim et al. |
| 2016/0092929 A1 | 3/2016 | Huang et al. |
| 2017/0012967 A1* | 1/2017 | Holloway ........... H04L 63/0823 |

OTHER PUBLICATIONS

"User Explorer", Retrieved from https://web.archive.org/web/20170410040627/https:/support.google.com/analytics/answer/6339208?hl=en, Apr. 10, 2017, 7 Pages.

Provost, et al., "Audience Selection for On-line Brand Advertising: Privacy-friendly Social Network Targeting", In Proceedings of 15th ACM SIGKDD International Conference on Knowledge Discovery and Data Mining, Jul. 28, 2009, pp. 707-715.

\* cited by examiner

SCALABLE SYSTEM FOR DYNAMIC USER AUDIENCE DETERMINATION

BACKGROUND

Collaborative content systems (e.g., MICROSOFT SHAREPOINT®) permit multiple users within an organization to edit, share, and view content. A user may log in to the content system and see content retrieved from multiple systems. Some of the content may be specific to the user, some may be applicable to a subset of users, and other content may be applicable to everyone. For example, a user may see the upcoming events/appointments that the user has added to the user's calendar. The user may see general announcements for the entire organization and announcements targeted to an audience the user is a part of such as a particular office location.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail the logical locations of variables that are stored or how they are retrieved. In such instances, it may be assumed that the variables are stored on a storage device accessible by the component via an API or other program communication method. Similarly, the variables may be assumed to have a default values should a specific value not be described. The system may provide a user interface for an end-user or administrator to edit the variable values in some instances Large organizations often have challenges in scaling technological infrastructure (e.g., databases, servers, etc.) with their organizational needs. For example, consider that a company uses a collaborative content system (CCS) that allows its employees (sometimes referred to simply as users) to view content (e.g., pictures, news items, calendar appointments). Some of the content may be selected based on the user. This type of content may be considered audience targeted. An audience may be a set of users that have properties that match an audience definition (e.g., a Boolean expression of user properties). For example, a supervisor may create an audience definition that includes the supervisor's direct report employees. Other properties (e.g., security levels, roles within an organization, etc.) of a user may also be used in creating audience definitions to target content resulting in the user belonging to several different audiences. When a user navigates to a web page served by the CCS, the user may see audience targeted content in addition to general content that is not concerned with audience targeting.

Although determining what set of audiences a single user belongs to may not be a computational expensive task (e.g., compare the user's properties to a set of audience definitions), the same determination for 50 k users at the same time may be too computational expensive to be practical. This may lead to other, higher priority, processes being delayed or unable to execute. In such a situation it is common to perform the computational expensive task at a time when slowness may be tolerated or more resources become available (e.g., in the middle of the night) or only performing the task according to a timer. Even in this scenario computing resources may be wasted because the process may run for all users in an organization regardless of whether a user uses the CCS.

Yet, for some organizations the time to complete the process (e.g., audience determination) for all users may require multiple nights to ensure performance of the general system is maintained at an acceptable level. Furthermore, every time a new audience is created, the process may be required to run against all the users to determine which users are part of the new audience—worsening an already computational expensive task. Until the process has completed for each audience definition, the user may be not see the appropriate content. This may include missing content that is supposed to be audience targeted to the user as well as seeing content for an audience of which the user is no longer a member. Similar problems may arise with notifications that are audience targeted. For example, if audiences for a user are not current, the user may not receive the correct notifications.

In view of the problems above, systems are described herein for balancing the needs to efficiently use computing resources and maintain up-to-date audiences for users. For example, audience determination may occur on an on-demand, individual basis as contrasted with a time-based (e.g., batched, periodically scheduled jobs) and tenant (e.g., performed organization wide) basis. The benefits of an on-demand process are two-fold. First, only one user need to have audiences determined at a time. Second, because each user's audience determination is separate from others, the calculation of multiple users' audiences becomes easily parallelizable.

Additionally, to reduce unnecessary computation of audiences for a user, a cached data store may store the calculated audiences for the user. The audiences for the user may be update if it is determined that the cached data store is stale. For example, if a new audience definition has been generated or if a user's properties have changed since the last request for content, the user's audiences may be determined again. The system may determine whether or not a user is part of an audience by comparing user properties of the user with the properties defined in each audience definition. Additional details and variations of the system are described herein.

Figure 1:
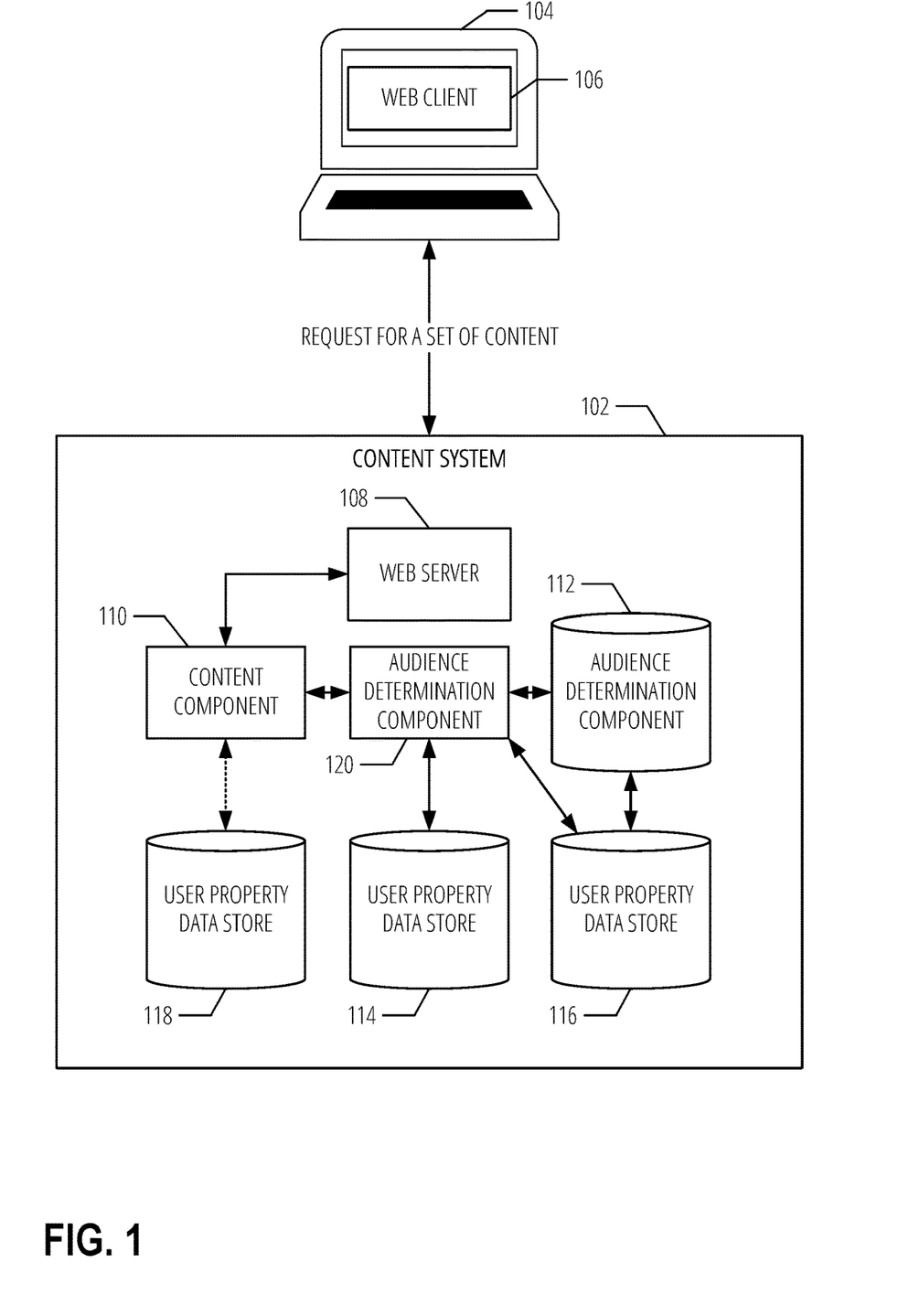
FIG. 1 is a diagrammatic representation of a networked environment in which a request for content may be processed, according to various examples.

FIG. 1 is a diagrammatic representation 100 of a networked environment in which a request for content may be processed, according to various examples. FIG. 1 includes content system 102, client device 104, web client 106, web server 108, content component 110, audience determination component 120, audience data store 112, cached data store 114, user property data store 116, and user data store 118.

For illustration purposes, content system 102 is illustrated as set of separate components. However, the functionality of individual components may be performed by a single component. A component may represent computer program code that is executable by a processing unit (e.g., a core of a general purpose computer processor, a graphical processing unit, an application specific integrated circuit, etc.) The program code may be stored on a storage device and loaded into a memory of the processing unit for execution. Portions of the program code may be executed in a parallel across multiple processing units. Execution of the code may be performed on a single device or distributed across multiple devices. In some examples, the program code is executed on a cloud platform (e.g., MICROSOFT AZURE® or AMAZON EC2®) using shared computing infrastructure. Additionally, the components and data stores in content system 102 are depicted as having certain connection pathways—illustrated as arrows. The arrows are used as discussion aids and not intended to limit communications between non-connected components.

Content system 102 illustrates four, separate data stores; however, like the components, the data stores may exist as fewer or additional data stores. For example, user property data store 116 and user data store 118 may exist as a single, logical data store. Regardless of the logical structure of the data stores, the physical locations of the data may exist in a single location or be distributed across multiple locations. In various examples, the data stores are replicated to ensure faster access depending on the geographic location of a request for data. The data stores may be stored on one or more storage devices (e.g., a hard disk, random access memory (RAM), etc.).

Furthermore, the specific storage layout and model used in by a data store may take a number of forms—indeed, a data store may utilize multiple models. The data stores may be, but are not limited to, relational databases (e.g., SQL), non-relational databases (NoSQL), flat file databases, object models, document details models, graph databases, shared ledgers (e.g., blockchain), or a file system hierarchy.

Client device 104 may be, but is not limited to, a smartphone, tablet, laptop, multi-processor system, microprocessor-based or programmable consumer electronics, game console, set-top box, or any other device that a user utilizes to communicate over a network to content system 102. In example embodiments, client device 104 comprises a display module (not shown) to display information (e.g., in the form of specially configured user interfaces). In some embodiments, client device 104 may comprise one or more of a touch screen, camera, keyboard, microphone, and Global Positioning System (GPS) sensors.

Client device 104 may communicate with content system 102 via a network. A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

As illustrated, client device 104 includes web client 106. Web client 106 may transmit a request for a set of content to content system 102. The request may be transmitted in response to a user entering in a uniform resource location (URL) corresponding to a website served by web server 108. In an example, the request may be transmitted when the user opens an application downloaded to client device 104. For example, the application, in the background without the need for the user to enter the URL, may transmit the request to content system 102. Content may include, but is not limited to, announcement/news postings, documents, images, and videos.

Figure 3:
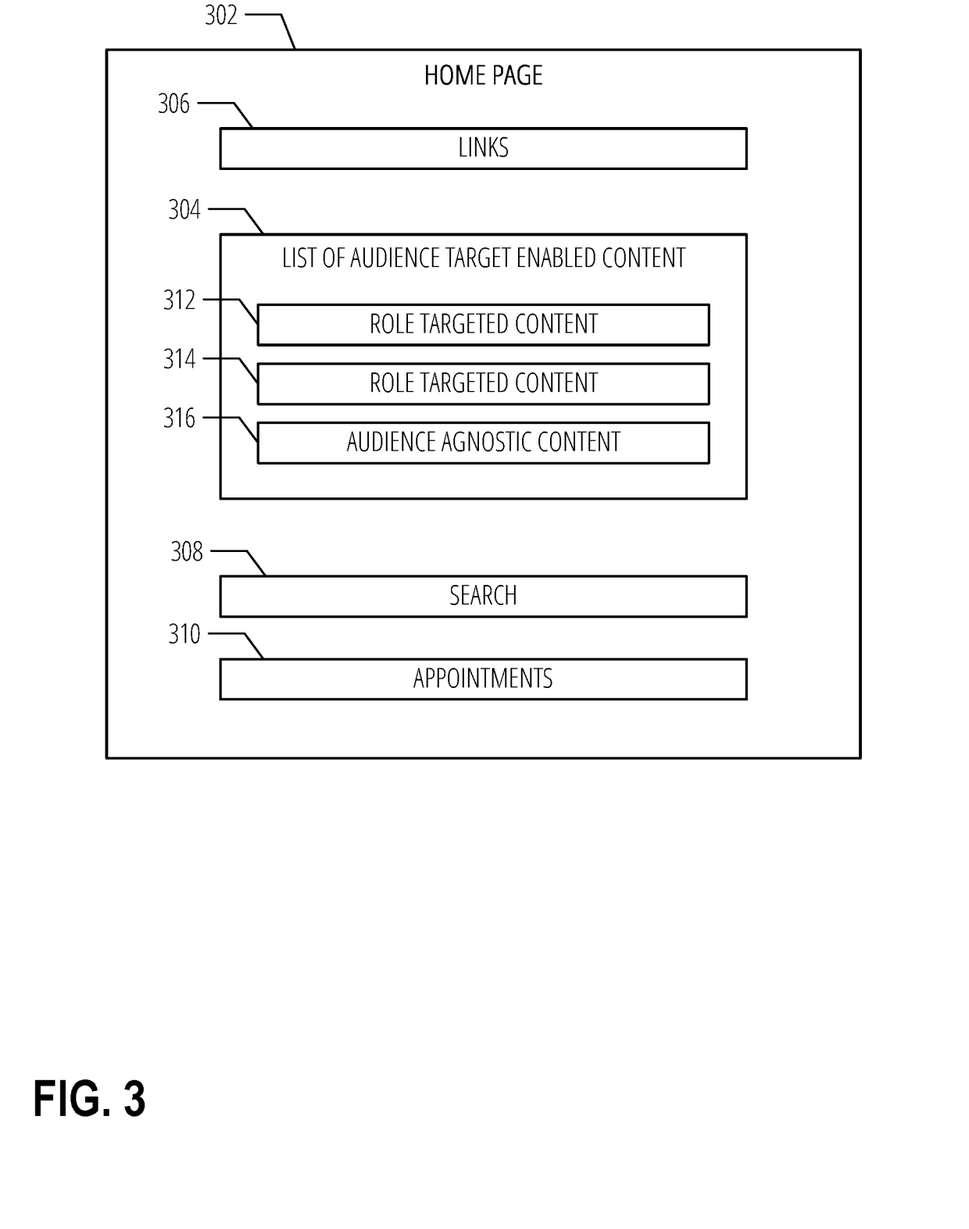
FIG. 3 is a block diagram illustrating a layout a set of content, according to various examples.

Content system 102 may implement a collaborative editing system for an organization. Although not illustrated as such content system 102 may serve multiple organizations (tenants). content system 102 may store each tenant's data stores separately in various examples. The collaborative editing system may serve (e.g., via web server 108) different content to each user of content system 102 based on a user identifier. The user identifier may be an e-mail address and the domain of the e-mail address may serve as an indication of the tenant. The collaborative editing system may include a series of web pages that are editable by authorized users. As a recurring example throughout the disclosure, the illustrated request for a set of content in FIG. 1 may be for a home page of the collaborative editing system. An example layout of a home page is depicted in FIG. 3.

Because of the potential sensitive and confidential nature of data stored by content system 102, various security measures may be used to protect data at rest and in transmit. For example, an API (not depicted) may use tokens or API keys to ensure only authorized parties may retrieve or update data in content system 102. Additionally, data transmitted over a network may use a cryptographic protocol, such Secure Socket Layer (SSL) or Transport Layer Security (TLS). As a further security precaution, the transmitted data itself may be encrypted, separately from the SSL or TLS encryption. Public-key infrastructure (PKI) may be leveraged for SSL/TLS as well as the separate data encryption In response to the request for the set of content, web server 108 may respond with renderable content to be displayed on client device 104 via web client 106. The renderable content may be presented at different stages to a user according to whether or not the content is audience targeted enabled or not. For example, an audience targeting tag may be set as enabled for an HTML element that is audience targeted. If the tag is not present or set as disabled, the element may be considered not audience targeted.

Audience agnostic content may be contrasted with content that is not audience targeted enabled at all. Audience agnostic content is content that is audience target enabled, but is applicable to all audiences (e.g., has a NULL audience). In contrast, content that is part of a web component/element that is not audience targeted enabled is not affected by the audience of the user in any form. For example, headings and an organization logo may be presented on the home page and may not be audience targeted enabled and thus be rendered first. A company-wide news posting, however, may be audience targeted to an "everyone" audience and may therefore be considered audience agnostic.

When the content is transmitted in stages, content that is not audience targeted may be displayed first because no audience determination is needed. In other examples, Then, after audience determination component 120 has determined the current audiences for the user, audience targeted content may be presented. Web server 108 may also respond with program code (e.g., JavaScript) that may be executed in the background. The program code may interact with audience determination component 120 via an API to receive a set of audiences the user is a part of Content component 110 may then use the set of audiences to deliver the audience targeted content via web server 108. In some examples, the content is not delivered in stages, but instead uses a cached state of the page (e.g., a last known good state) that may be refreshed audience-targeted content is retrieved.

Audience data store 112 may store a set of audience definitions. An audience definition may be stored as a logical expression of user properties—also referred to as user property criteria. For example, user property criteria may include title, reporting chain, hire date, department, office, location, roles, security groups, etc. An example expression for an audience of developers in Redmond may be: (User u)=>u.Location=="Redmond" && u.Title.Contains("Developer").

Content system 102 may include an audience definition component (not illustrated) that presents a user interface (UI) for defining an audience. The UI may be presented as a set of UI elements in a webpage. For example, a drop-down menu may include the available user properties and another drop-down menu may present Boolean logic operators. Multiple entries may be combined to define an audience (e.g., title includes "engineer" and reports to "NAME"). Other types of interfaces may be used to define an audience definition without departing from the scope of this disclosure.

In various examples, there may be a set of common user properties (e.g., location, e-mail distribution lists) across all organizations. Different organizations may have different, custom user properties. For example, the common user properties may only permit a single role description (e.g., sales manager) but this may not be flexible enough for some organizations in which a user may have multiple roles. Similarly, the single role description may not allow for inheriting roles (e.g., in a hierarchy). Accordingly, when a user logs into content system 102 the user properties specific to the organization may be presented in the UI for defining an audience.

A resulting generated audience definition may be stored in audience data store 112 as a logical expression, in various examples. An audience definition may be stored as associated with a tenant (organization) in audience data store 112. For example, a column in a database table may indicate the tenant. An audience definition may automatically be given an identifier when created that is stored with the audience definition. The creator of the audience may also give the audience a name that is stored as part of the audience definition. In various examples, an audience may be defined for a site scope such that the audience may only be applicable to content items in a site or department.

Content system 102 may also provide a user interface for tagging content items with an audience. For example, the author of the article may be presented with a UI control for tagging where the author could select one or more audiences from a list of applicable audiences to apply to the item. The identification of the audience may then be associated with the content item (as metadata or in audience field, for example). The tagged content may be stored in a content store (not illustrated) that may be queried by web server 108 or client device 104.

User property data store 116 may store properties for the users of content system 102. The properties may be distributed across multiple logical locations. For example, some user properties may be stored as a part of a user profile in a directory service (e.g., MICROSOFT ACTIVE DIRECTORY®). The types of user properties in such a profile may be the common user properties. One or more other services/systems may provide custom users properties. A single user identifier may be used to query the user properties from the directory service and any other services. In various examples, the user profile may be updated to include the custom user properties. The user properties may be replicated across multiple systems for faster lookup. For example, user data store 118 may also store the user properties.

User data store 118 may be provided as part of a file hosting service. The file hosting service may permit the user to backup and sync documents created on the user's computing device to an external storage device and other devices of the user (e.g., MICROSOFT ONEDRIVE®, GOOGLE DRIVE®, or a MICROSOFT® Exchange Mailbox). In various examples, collection of files that are stored with the file hosting service are referred to as a shared drive. The shared drive may be replicated on the file hosting service and any devices the user chooses. In various examples, the shared drives of users are stored in user data store 118. In various examples, the shared drive may be part of a software as a service (SaaS) suite (e.g., MICROSOFT OFFICE 365® or GOOGLE G SUITE®) that includes a collaborative content system such as content system 102.

In addition to storing data files that a user has added, the shared drive may be used to implement features of content system 102. In various examples, some data stored in user data store 118 may be invisible to the actual user. For example, user data store 118 may be used to cache the last known good (LKG) state of a user requested web page (e.g., the home page). The LKG state may be used to render content on client device 104 while additional data may be retrieved. For example, after fully loading the home page, the contents of the home page may be stored in user data store 118. Then, the next time the user visits the home page, the LKG may be used to render data nearly instantly while waiting for the data to be refreshed.

Cached data store 114 may store the generated set of audiences for a user. For example, the set of audiences determined by audience determination component 120 may be stored in cached data store 114. Cached data store 114 may have a timer (e.g., seven days) after which the generated set of audiences is deleted for the user.

Figure 2:
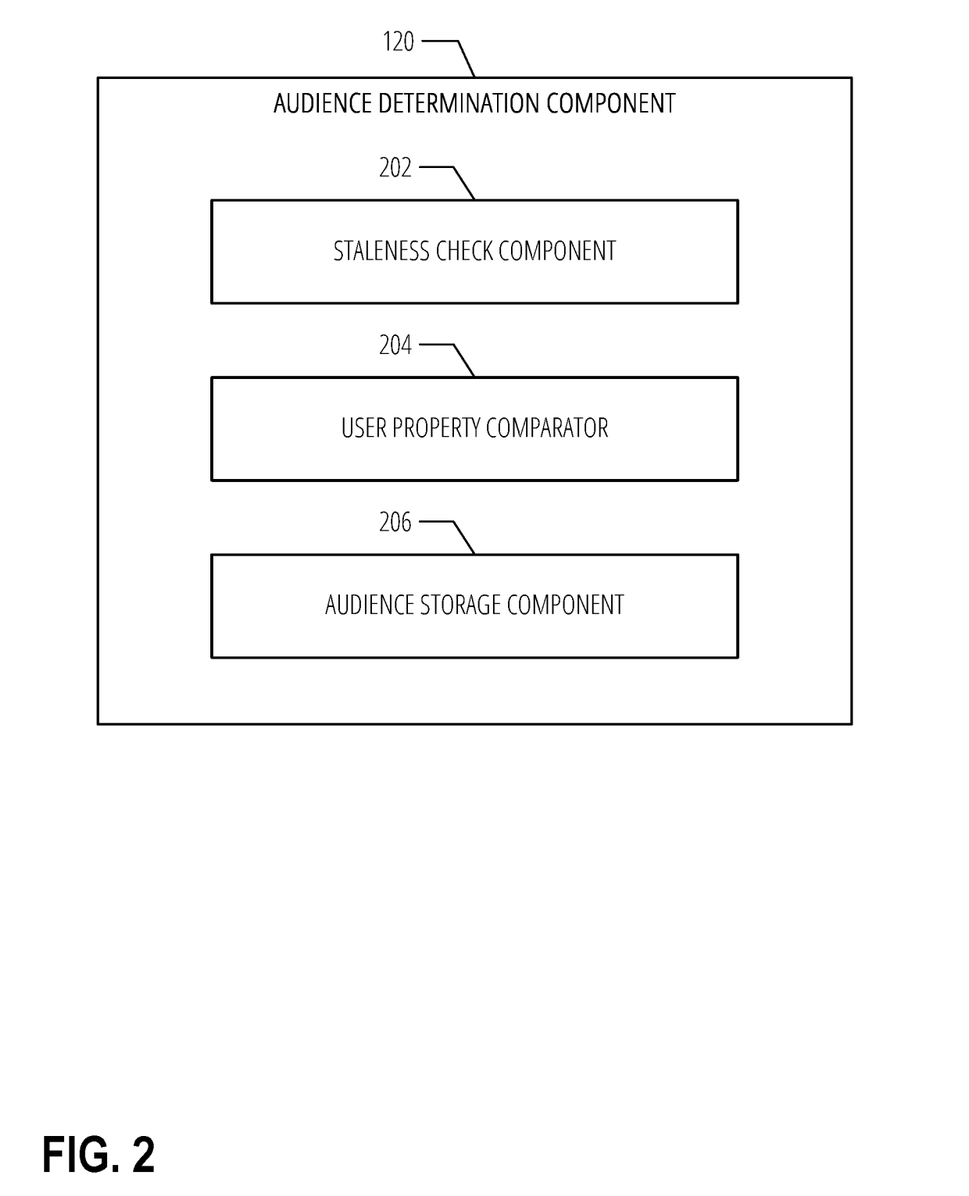
FIG. 2 is a component diagram of an audience determination component, according to various examples.

FIG. 2 is a component diagram of an audience determination component 120, according to various examples. Audience determination component 120 may include staleness check component 202, user property comparator 204, and audience storage component 206.

In various examples, audience determination component 120 is called when a request is received from client device 104 for a set of content, such as a web page. Staleness check component 202 may use a variety of methods to determine if cached data store 114 is stale. Stale may mean that no audiences are stored in cached data store 114 or a timer has expired indicating the stored audiences for the user are no longer valid. Another method may include retrieving a last modified date of audience data store 112. If the last modified date is newer than the date audiences were added to cached data store 114, the cache may be considered stale.

The staleness methods may be used in combination. For example, even though an audience definition may not have changed—and therefore the last modified date may be old—the user may no longer be a part of an audience if the user properties have changed for the user. Accordingly, staleness check component 202 may first check the last modified date. If a timer has expired, however, the user's audiences may be determined anew even if the last modified date is older than the date of last modified date of the cached data store 114 for the user.

If the cache is stale, audience determination component 120 may generate a set of audiences for the user via user property comparator 204, in various examples. User property comparator 204 may retrieve a set of audience definitions from audience data store 112 that include respective user property criteria. The audience definitions may be retrieved according to an organization of the user. User property comparator 204 may also retrieve user properties of the user. The user properties may be retrieved from user property data store 116 in various examples. Then, user property comparator 204 may evaluate the user property criteria for each audience definition against the user properties to determine the set of audiences for the user.

Audience determination component 120 may also copy the retrieved user properties to various locations. As discussed previously, the user properties may be scattered across multiple systems. Accordingly, the retrieval of all the user properties by user property comparator 204 may be leveraged to copy the user properties into locations that generally do not have access to all the user properties. For example, custom, organization specific user properties may be copied to a directory service.

Audience storage component 206 may store the resulting set of audiences in one or more locations. For example, audience storage component 206 may update cached data store 114 with the set of audiences. The update may include removing some audiences, while adding others. If applicable, a timer may be reset for cached data store 114 as well. A timer may be user specific, in various examples.

FIG. 3 is a block diagram illustrating a layout of a set of content, according to various examples. FIG. 3 as illustrated, includes: user interface 302, list of audience target enabled content 304, links 306, search 308, appointments 310, role targeted content 312, role targeted content 314, and audience agnostic content 316.

User interface 302 may represent a home page that is displayed to a user when requesting a set of content via web client 106 on client device 104. The request may include a user identifier of the user. In various examples, the user identifier may already be known by content system 102 via a prior authentication and as associated with a session identifier used with the request.

The set of content may be loaded at different types depending on if an element is audience targeted enabled. For example, a subset of content that is audience targeted disabled or has no indication of audience targeting preference may be loaded and displayed first. This content may include links 306, search 308, and appointments 310. Concurrently with, or after the subset of content that is audience targeted disabled is loaded, a call (e.g., an API call) may be made to audience determination component 120 to retrieve the set of audiences of the user logged into content system 102 based on the user identifier.

After the set of audiences has been received, web client 106 may transmit a request for the subset of content that is audience targeted enabled such as list of audience target enabled content 304. The request may include the set of audiences for the user. The request may be formatted as a search for content. The request may be processed by content component 110 via web server 108. Content illustrated in list of audience target enabled content 304 may be transmitted back to web client 106 as a result of the request.

In another example, web server 108 may issue a query to determine set of audiences—as opposed to web client 106. After the set of audiences is determined, web server 108 may then pass a list of the set of audiences with a query for content, which is eventually passed back to web client 106. In such an example, the set of audiences is never transmitted to web client 106.

In various examples, the order of content in list of audience target enabled content 304 may be ordered in a number of ways that emphasize or de-emphasize audience targeting according to prioritization criteria. The prioritization criteria may be sent as part of the search request.

Prioritization criteria may include a filter option that removes all content items tagged with audiences that the user is not a member of. The filter option may leave in audience agnostic content. A deboost criteria may be used that leaves content in that the audience is not a member of, but orders such content lower in a results list. Audience agnostic content may remain in its normal order in the results. The deboost criteria may indicate how far down the results list to place audience targeted content that the user is not a part of (e.g., begin showing after five results or always place such content at the end). A boost criteria may move items that are tagged with an audience the user is a member of up in the results list. Multiple prioritization criteria may be used together such as boost and deboost.

Figure 4:
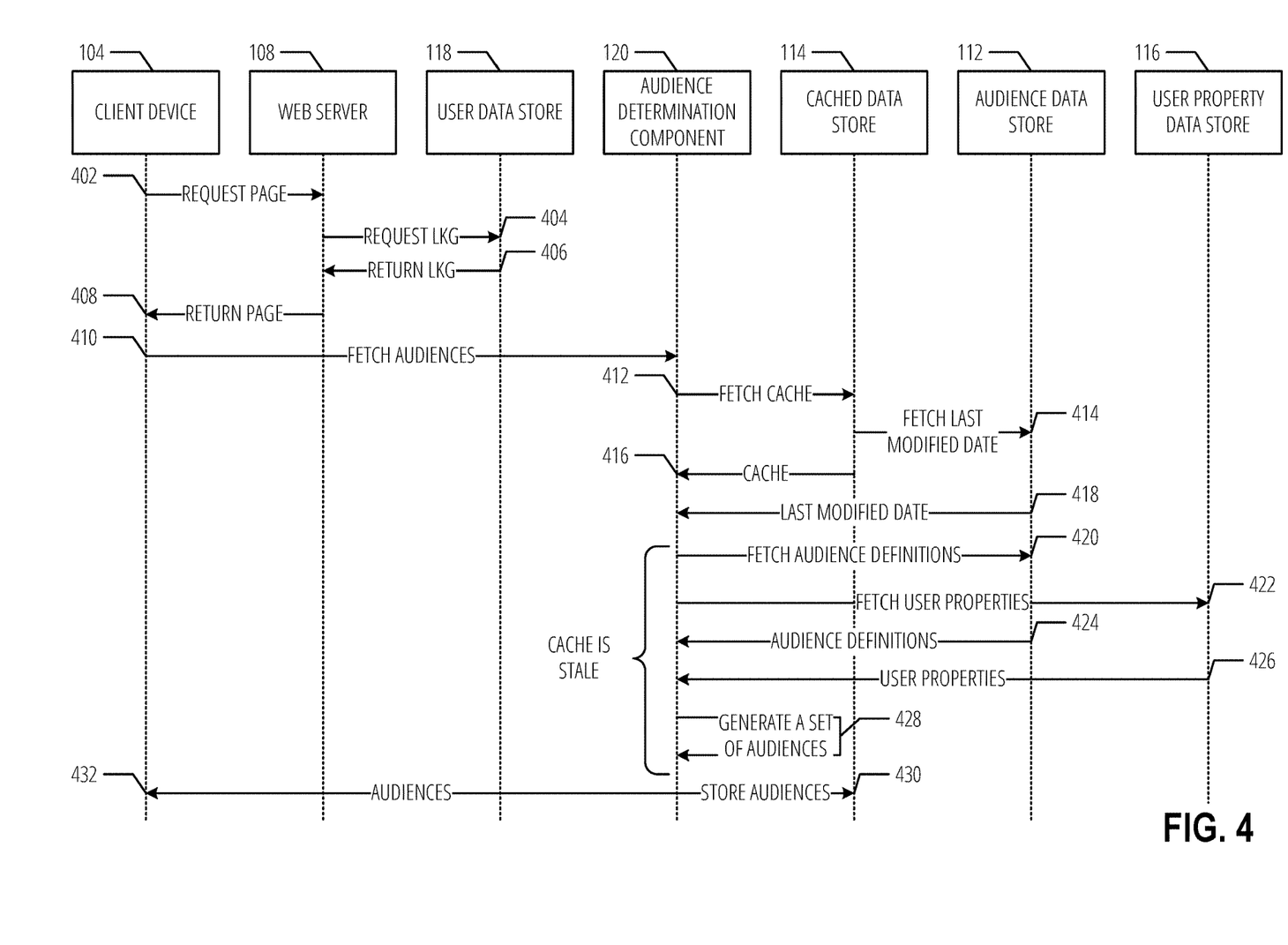
FIG. 4 is s a communication flow diagram illustrating operations to generate a set of audiences for a user, according to various examples.

FIG. 4 is a communication flow diagram illustrating operations to generate a set of audiences for a user, according to various examples. FIG. 4 includes client device 104, web server 108, user data store 118, audience determination component 120, cached data store 114, audience data store 112, and user property data store 116. Additionally, FIG. 4 includes operations 402-432.

At operation 402, client device 104 may request a web page from web server 108. The request may be for a web page hosted by content system 102 and the request may be formatted as an HTTP request. The request may be associated with a user identifier. In response, web server 108 may first obtain request the last known good (LKG) state of the web page from user data store 118 and operation 404. At operation 406, user data store 118 may return the last known good state. In turn, web server 108 may transmit data representing the web page for rendering on a display device of client device 104 at operation 408. Some of the information that is rendered from the LKG state may be refreshed after operations 402-432, for example, after a set of audiences for the user is determined and the relevant audience-targeted content is retrieved.

Elements of the returned web page may be audience targeting enabled. Accordingly, at operation 410, audiences may be fetched via a call to audience determination component 120. The call may be an API called passed through web server 108. At operation 412, audience determination component 120 may request cached audiences for the user according to the user identifier received as part of the API call. At operation 414, the last modified date of audience data store 112 may be requested. The cached audiences and the last modified date may be transmitted back to audience determination component 120 with operations 416 and 418, respectively.

Audience determination component 120 may determine if the cache is stale by comparing the last modified date of audience data store 112 with the last modified date of cached data store 114. The cache may also be considered stale if a timer has expired or if too much time (e.g., seven days) has passed since the last modified date of cached data store 114.

Assuming the cache is stale, at operation 420 and operation 422, audience definitions and user properties are retrieved. Audience determination component 120 may generate a set of audiences for the user at operation 428. For example, the audience definitions may be evaluated against the retrieved user properties. After the set of audiences is generated for the users, the set of audiences may be stored in cached data store 114 at operation 430. Storing may include storing the identifier of each audience. Additionally, the set of audiences may be transmitted back to client device 104 that may use them to retrieve audience targeted content. If the cache is not stale, audience determination component 120 may retrieve the cached set of audiences and transmit them to client device 104. In some examples, the set audiences is not returned to client device 104 but is used by web server 108 to retrieve audience-targeted content.

After the audiences are determined, a query may be made to web server 108 (not illustrated) to retrieve the content that is audience-targeted to the set of audiences. As an example, a query may be "SELECT*FROM news WHERE audiences=NULL OR audiences in (id1, id2)" in which id1 and id2 correspond to the audience identifiers of the audiences in the set of audiences. Although presented as pseudo SQL code, other query languages may be used without departing from the scope of this disclosure. The results of the query may be content that has been tagged with an audience that the user is a member of. Additional parameters or queries may be used to determine what to do with content tagged with an audience that the user is not a member of as discussed above with respect to prioritization criteria.

After the content is retrieved, portions of the web page presented on client device 104 may be refreshed. In some examples, the LKG state is updated with the completed web page.

Although generally discussed in the context of content in a web page, the systems described herein may have benefits to other workflows as well. For example, when a new piece of content is added to a collaborative content systems, relevant users are often notified. These users may be based on organizational charts, working relationships, and site interaction habits, in various examples. As with filtering out items that are targeted audiences that a user is not a part of, it may be useful to filter out notifications in a similar manner.

For scaling reasons, it may not be feasible to compute anything about recipients at sending time. Instead, the set of potentially interested recipients may be calculated, then notifications may be transmitted to the users via a mail server (e.g., Microsoft Exchange). Only then may filtering computations (including ACL trimming and relevancy) be made at each user's mailbox. This, however, introduces its own scale problem, as many mailboxes receiving a notification at the same time all potentially reaching out to any single service (e.g., audience determination component 120) may have the effect of a distributed denial of service (DDOS) of that service.

In view of the above, at the time of notification arrival only limited information may be available such as metadata about the author/site/item the notification was generated for and none of the recipient's audiences. Furthermore, because of the potential DDOS, querying user property data store 116 to retrieve the user properties or audience data store 112 may not be feasible. Accordingly, a few methods are described below that may be used to help alleviate the problems described.

The first method is to store audiences generated during a web page request (e.g., as illustrated in FIG. 4) at the user's mailbox or as part of user profile in directory service. Then, the relevant audience identifiers may be transmitted with the news item to determine if the news item is relevant to the user. A comparison may be made at the mailbox between the identifiers received with the news item and the identifiers stored in the set of audiences as retrieved/stored in cached data store 114 during a web page request. Only if there is a match may the user receive a notification (e.g., an e-mail, push notification, etc.) of the news item.

The second method is to store the user properties gathered during the generating audiences operation at the mailbox/directory service and pass the audience definition expressions with the news item. Accordingly, based on the information at the mailbox it may be determined if the news item is relevant to the user without querying other systems.

This first method introduces a potential latency and staleness problem, however, as any newly created audience definition used on an item would be filtered out for any user whose cache hasn't been updated. It also suffers a bootstrapping problem, filtering out all items with audiences until their cache is created. These downsides may be minimized by forcing a recalculation of audiences periodically.

The second method takes advantage of the fact that user properties change infrequently. Since expressions are passed on the item, the latest audience definitions are always present. There is still a potential to suffer stale user properties and have a bootstrapping problem for user properties (though security groups and some properties may already be available). Both impacts could be minimized by forcing a fetch of the cache. For example, once a week, properties that are not at the mailbox/directory service may be retrieved.

Figure 5:
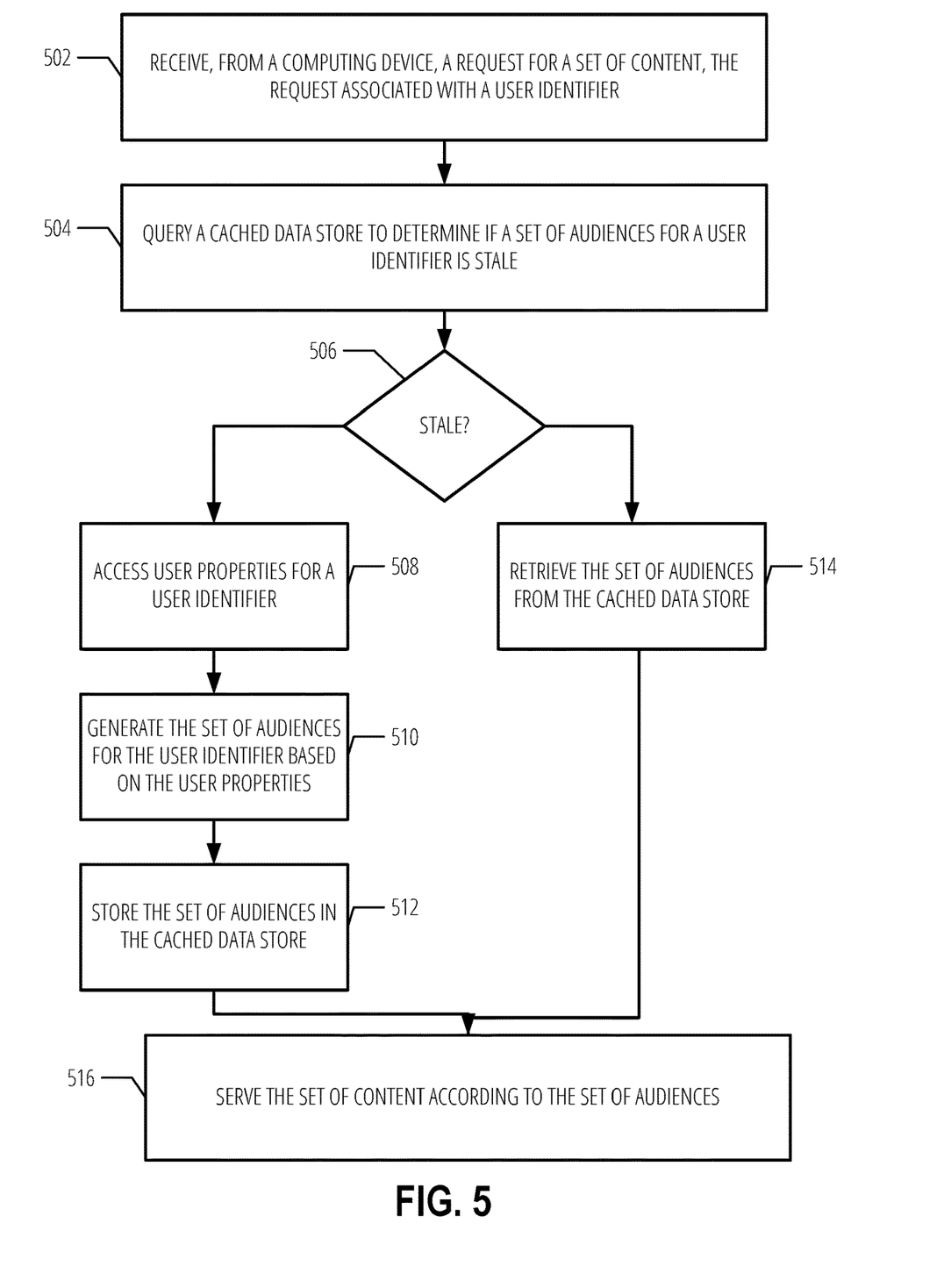
FIG. 5 is a flowchart representation of a method to generate a set of audiences, according to various examples

FIG. 5 is a flowchart representation of a computer-implemented method to generate a set of audiences, according to various examples. The method is represented as a set of blocks that described operations of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 5. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In block 502, a request for a set of content is received from a computing device. The request may be received at a server such as web server 108 that is part of larger system such as content system 102. The request may be for a web page. The request may be associated with a user identifier (e.g., an email address, session ID that is associated with the e-mail address, a login, etc.).

At block 504, a cached data store is queried to determine if a set of audiences for the user identifier is stale. Determining staleness may include retrieving a last modified date of a set of audience definitions. The last modified date may be stored as part of an audience data store in various examples. The last modified date of the set of audience definitions may be compared to a last modified date of a set of audiences stored in the cached data store for the user. If the last modified date of the set of audience definitions is newer than the set of audiences, the set of audiences may be considered stale.

Accordingly, if the result of decision block 506 indicates the set of audiences is stale, flow continues to block 508. At block 508, user properties for the user identifier are accessed. The user properties may be retrieved from a single data source or multiple data sources. In various examples, the collective accessed user properties are transmitted to the individual data stores for storage to provide a more complete set of user properties at each storage location (e.g., a user's mailbox or user profile).

At block 510, the set of audiences for the user identifier are generated based on the user properties. For example, a set of audience definitions may be accessed. A respective audience definition may identify user property criteria for the respective audience definition. A new audience may be added to the set of audiences for the user identifier when the user properties for the user identifier match the user property criteria for the new audience in the set of audience definitions. In various examples, generating the set of audiences may include removing audiences from the set of audiences stored in the cached data store. In various examples, the user properties may include a role (e.g., title) and a location. The user property criteria for the new audience may indicate members of the new audience include users in a reporting chain to a particular user. For example, a user property may include who the user reports to. The criteria may be recursive such that if user A reports to user to B and user C reports to user B, both users B and C will be included in the new audience.

At block 512, the generated set of audiences may be stored in the cached data store. In various examples, a timer may be reset in the cache with respect to the user identifier. The set of audiences may include an identification of each of the audiences.

The generated set of audiences may also be stored in other data stores such as a mailbox data store of the user. These stored sets of audiences may then be used to filter out content items that are received at the mailbox. For example, when a content item is created and tagged with audience identifiers, a hidden message may be transmitted to all users' mailboxes with the content and the tagged audience identifiers Then, when the hidden message arrives with the content item, a comparison may be made between the tagged audience identifiers and the generated set of audience identifiers as stored in the mailbox data store of each respective user. If there is a match, a notification (e.g., the message may be unhidden, a push notification, etc.) may be transmitted to the respective user. If no match is made, the content item may be deleted from the respective user's mailbox data store.

If decision block 506 indicates the set of audiences is current (e.g., not stale), at block 514 the previously generated set of audiences may be retrieved from the cached data store. Block 514 may occur if a subsequent request for content is received after the operations in block 508, block 510, and block 512 have been performed.

At block 516, the set of content may be served according to the generated set of audiences. For example, a query may be made to a content store with identifications of the set of audiences. The query may be made from a client device or from within a web server. A comparison may be made between the identifications and tagged audiences of content to determine if a piece of content is targeted towards an audience the user is a member of.

The set of content may include a subset of content that is audience targeted enabled and a subset of content that is audience targeted disabled. The subset of content that is audience targeted disabled may be served in response to the request for the set of content prior to the querying at block 504 and the subset of content that is audience targeted enabled may be served after the querying. In various examples, serving the subset of content that is audience targeted enabled includes prioritizing content within the subset of content that is audience targeted enabled applicable to the set of audiences. For example, if the user is a member of the set of audiences and a content item is targeted to that audience, the content item may be displayed first in an ordered list of content items.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
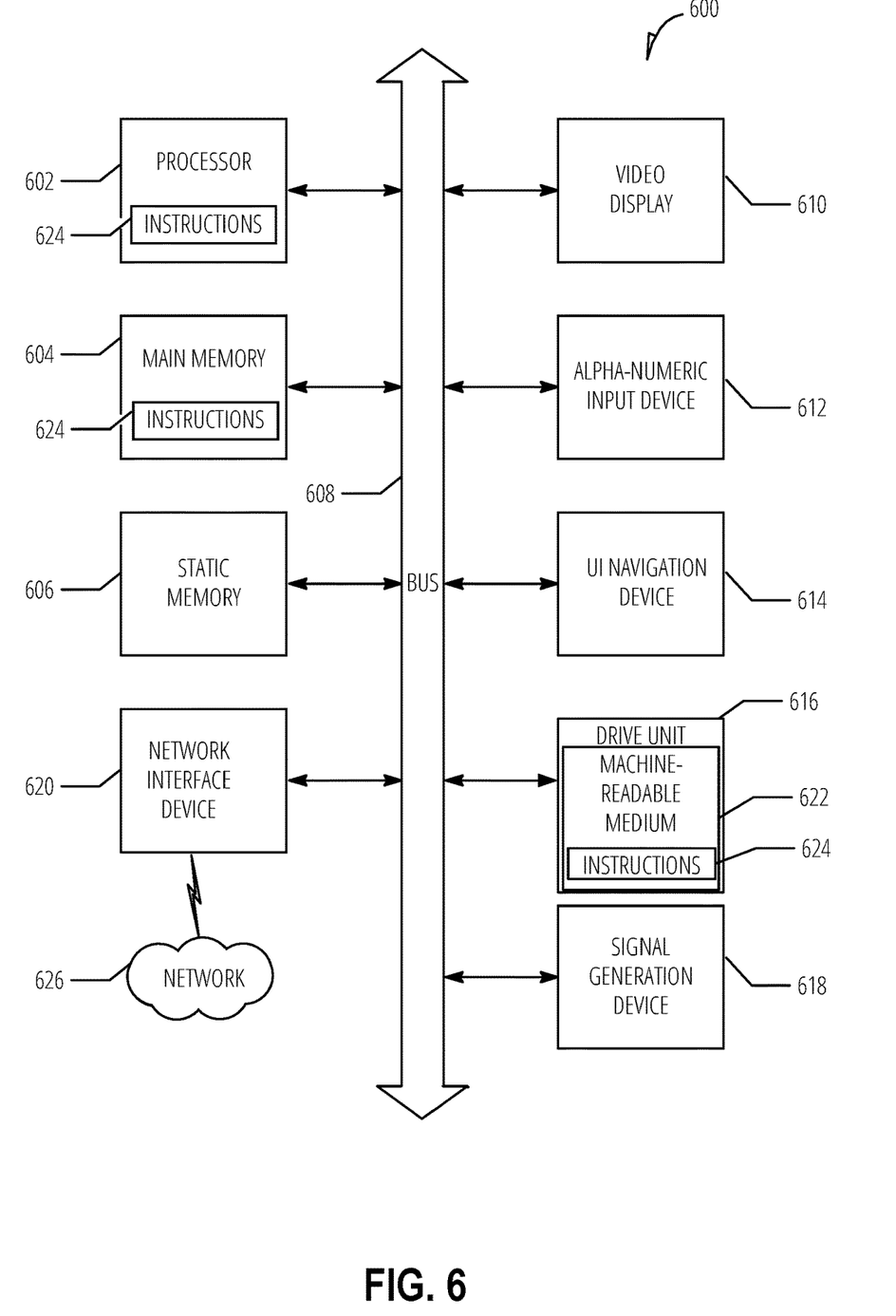
FIG. 6 is a block diagram illustrating an example machine upon which any one or more of the techniques (e.g., methodologies) discussed herein may be performed, according to an example embodiment

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or another sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device is a machine-readable medium that excludes transitory signals.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A system comprising:

a processor; and a memory storing instructions that, when executed by the processor, configure the processor to:

receive, from a computing device, a request for a set of content, the request associated with a user identifier;

query a cached data store to determine that a set of audiences for the user identifier is stale;

query an audience definition from an audience data store, based on the user identifier;

query stored user properties from a user property data store, based on the user identifier;

determine that the set of audiences for the user identifier is stale by: determining that a timer for the user identifier has expired indicating that the stored user properties for the user are no longer valid for the audience definition and that a last modified date of the audience definition is newer than a date of the audience definition stored at the cached data store;

in response to the determination that the set of audiences is stale:

access updated user properties for the user identifier;

generate the set of audiences for the user identifier based on the updated user properties;

reset the timer in the cached data store for the user identifier; and serve the set of content according to the generated set of audiences.

2. The system of claim 1, wherein the instructions further configure the processor to:
   after generating the set of audiences, store the generated set of audiences in the cached data store;
   receive a subsequent request for the set of content; and
   in response to receiving the subsequent request:
   query the cached data store to determine that the set of audiences for the user identifier is current; and
   serve the set of content according to the set of audiences.

3. The system of claim 2, wherein the instructions further configure the processor to:
   store the generated set of audiences in a mailbox data store of the user, each respective audience in the set of audiences including an audience identifier;
   receive an indication of an arrival of a content item in the mailbox data store, the content item tagged with a set of audience identifiers;
   retrieve the generated set of audience from the mailbox data store;
   if an audience identifier in the retrieved sets of audiences matches a tagged audience identifier of the content item, transmit a notification to the user of the content item; and
   if no audience identifier in the retrieved set of audiences matches a tagged audience identifier of the content item, delete the content item from the mailbox data store of the user.

4. The system of claim 1, wherein to generate the set of audiences for the user identifier based on the updated user properties the processor is configured to:
   access a set of audience definitions, wherein a respective audience definition identifies user property criteria for the respective audience definition; and
   add a new audience to the set of audiences for the user identifier when the updated user properties for the user identifier match the user property criteria for the new audience in the set of audience definitions.

5. The system of claim 4, wherein the user property criteria for the new audience indicate members of the new audience include users in a reporting chain to a particular user.

6. The system of claim 1, wherein the set of content includes a subset of content that is audience targeted enabled and a subset of content that is audience targeted disabled.

7. The system of claim 6, wherein the subset of content that is audience targeted disabled is served in response to the request for the set of content prior to the querying and the subset of content that is audience targeted enabled is served after the querying.

8. The system of claim 7, wherein serving the subset of content that is audience targeted enabled includes prioritizing content within the subset of content that is audience targeted enabled and has been tagged with an audience in the set of audiences.

9. The system of claim 1, wherein to query the cached data store to determine that that the set of audiences for the user identifier is stale, the processor is configured to:
   retrieve a last modified date of a set of audience definitions; and
   compare the last modified date to a last modified date of the cached data store.

10. A method, comprising:
    receiving, from a computing device, a request for a set of content, the request associated with a user identifier;
    querying a cached data store to determine that a set of audiences for the user identifier is stale;
    querying an audience definition from an audience data store, based on the user identifier;
    querying stored user properties from a user property data store, based on the user identifier;
    determining that the set of audiences for the user identifier is stale by: determining that a timer for the user identifier has expired indicating that the stored user properties for the user are no longer valid for the audience definition and that a last modified date of the audience definition is newer than a date of the audience definition stored at the cached data store;
    in response to the determination that the set of audiences is stale:
    accessing updated user properties for the user identifier;
    generating the set of audiences for the user identifier based on the updated user properties;
    resetting the timer in the cached data store for the user identifier; and
    serving the set of content according to the generated set of audiences.

11. The method of claim 10, further comprising:
    after generating the set of audiences, storing the generated set of audiences in the cached data store;
    receiving a subsequent request for the set of content; and
    in response to receiving the subsequent request:
    querying the cached data store to determine that the set of audiences for the user identifier is current; and
    serving the set of content according to the set of audiences.

12. The method of claim 10, wherein generating the set of audiences for the user identifier based on the updated user properties includes:
    accessing a set of audience definitions, wherein a respective audience definition identifies user property criteria for the respective audience definition; and
    adding a new audience to the set of audiences for the user identifier when the updated user properties for the user identifier match the user property criteria for the new audience in the set of audience definitions.

13. The method of claim 10, wherein the set of content includes a subset of content that is audience targeted enabled and a subset of content that is audience targeted disabled.

14. The method of claim 13, wherein the subset of content that is audience targeted disabled is served in response to the request for the set of content prior to the querying and the subset of content that is audience targeted enabled is served after the querying.

15. The method of claim 14, wherein serving the subset of content that is audience targeted enabled includes prioritizing content within the subset of content that is audience targeted enabled and has been tagged with an audience in to the set of audiences.

16. The method of claim 10, wherein the updated user properties include a role property within an organization.

17. The method of claim 10, wherein querying the cached data store to determine that that the set of audiences for the user identifier is stale includes:
    retrieving a last modified date of a set of audience definitions; and
    comparing the last modified date to a last modified date of the cached data store.

18. A computer-readable storage device, the computer-readable storage device including instructions that when executed by a computer, cause the computer to:

receive, from a computing device, a request for a set of content, the request associated with a user identifier;

query a cached data store to determine that a set of audiences for the user identifier is stale;

query an audience definition from an audience data store, based on the user identifier;

query stored user properties from a user property data store, based on the user identifier;

determine that the set of audiences for the user identifier is stale by: determining that a timer for the user identifier has expired indicating that the stored user properties for the user are no longer valid for the audience definition and that a last modified date of the audience definition is newer than a date of the audience definition stored at the cached data store;

in response to the determination that the set of audiences is stale:

access updated user properties for the user identifier;

generate the set of audiences for the user identifier based on the updated user properties;

reset the timer in the cached data store for the user identifier; and serve the set of content according to the generated set of audiences.

19. The computer-readable storage device of claim 18, wherein the instructions further configure the computer to:

after generating the set of audiences, store the generated set of audiences in the cached data store;

receive a subsequent request for the set of content; and in response to receiving the subsequent request:

query the cached data store to determine that the set of audiences for the user identifier is current; and serve the set of content according to the set of audiences.

20. The computer-readable storage device of claim 18, wherein to generate the set of audiences for the user identifier based on the updated user properties the computer is configured to:

access a set of audience definitions, wherein a respective audience definition identifies user property criteria for the respective audience definition; and add a new audience to the set of audiences for the user identifier when the updated user properties for the user identifier match the user property criteria for the new audience in the set of audience definitions.

* * * * *